Sept. 27, 1932.  E. WOLPERT  1,879,724
SEAT
Filed June 6, 1931  2 Sheets-Sheet 1

INVENTOR.
EMIL WOLPERT.
ATTORNEY.

Sept. 27, 1932. E. WOLPERT 1,879,724
SEAT
Filed June 6, 1931 2 Sheets-Sheet 2
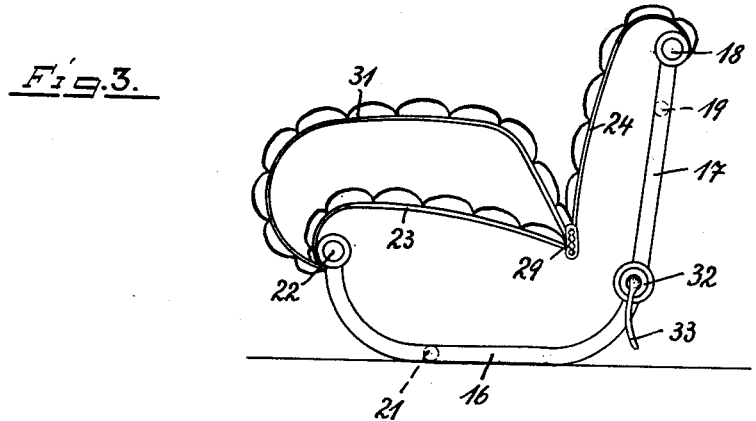
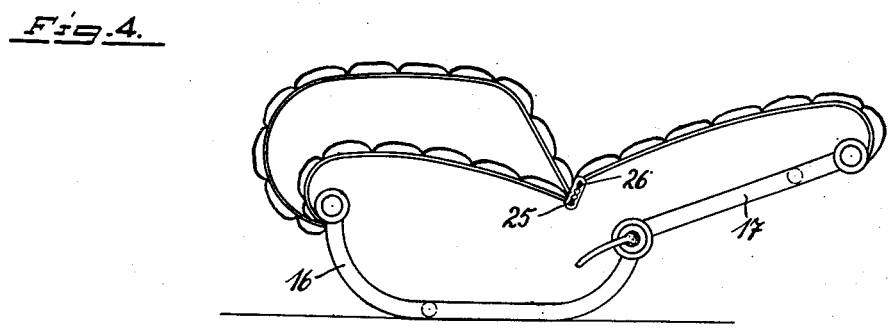
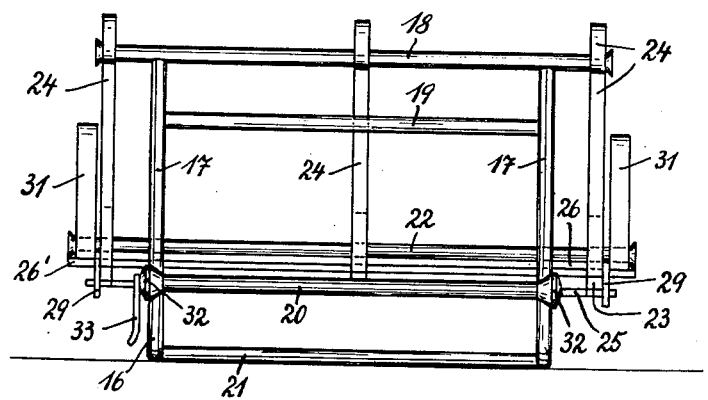
INVENTOR.
EMIL WOLPERT.
ATTORNEY.

Patented Sept. 27, 1932

1,879,724

UNITED STATES PATENT OFFICE

EMIL WOLPERT, OF STUTTGART, GERMANY

SEAT

Application filed June 6, 1931, Serial No. 542,621, and in Germany November 25, 1929.

My invention is concerned with seats having backs, and is applicable more particularly, but not exclusively, to seats in automobile vehicles and in the cabins of aircraft.

According to my invention springs of the strip or band type are attached to a front, transverse bar or rail of the seat, from which they extend rearwards, and other springs of the same type are attached to a top, transverse bar or rail of the back, from which they are suspended, and the two sets of springs are connected to each other where the seating surface joins the back.

The invention is illustrated in the accompanying drawings, showing two embodiments thereof in Figs. 1 to 3 and Figs. 5 to 8 respectively.

Figure 1:
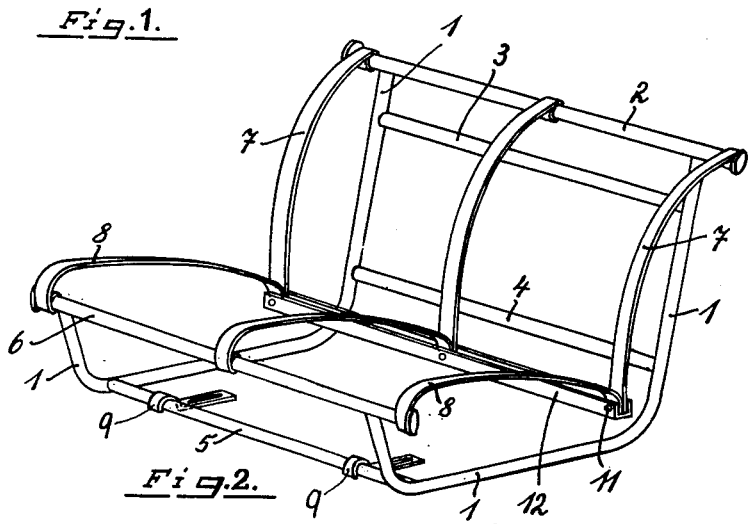
Figure 2:
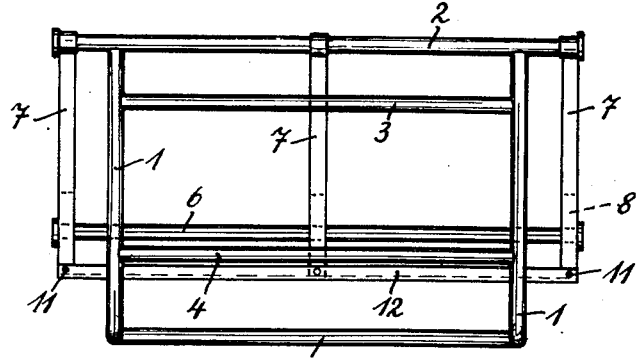
Figure 6:
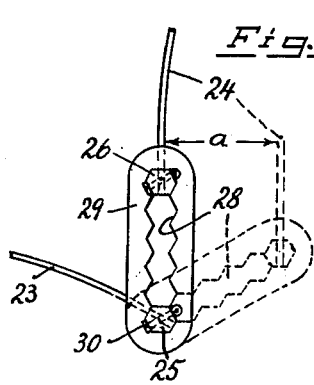
Figure 7:
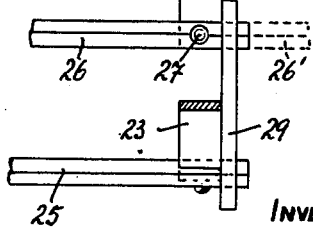

Fig. 1 is a perspective view of a seat with the upholstery removed therefrom, and Fig. 2 is a rear view thereof, Fig. 3 is a side view of the second embodiment, and Fig. 4 is a side view of the same seat, but with the back adjusted for reclining, Fig. 5 being a rear view with the upholstery removed, Figs. 6 and 7 are respectively a side view and a front view, to a larger scale, showing the connection between the seat springs and the back springs.

Referring first to the construction shown in Figs. 1 and 2, the main frame has two side members 1, which are approximately U-shaped, but with the rear limbs much longer than the front limbs. These two side members 1 are connected to each other by cross-bars 2, 3, 4, 5, 6. The cross-bars 2 and 6 project somewhat beyond the sides of the main frame. For the back and the seat there are curved strip springs 7 and 8 respectively, the springs 7 being attached to the cross-bar 2, from which they extend downwards, and the springs 8 being attached to the cross-bar 6, from which they extend rearwards. The lower ends of the springs 7 and the rear ends of the arched springs 8 lie flat against each other within a channelled bar 12, and rivets 11 pass through the flanges of this bar, and through the springs, so that the seat springs and back springs are firmly joined to each other, but the bar is not fixed to the frame.

The side members 1 of the frame and the cross-bar 5, which is near the front, rest upon the floor. The cross-bar 5 is held down by clamps 9, but these do not prevent rotation thereof, so that the seat can be tilted forwards if required. This is convenient where the seat is in front of another seat in a confined space, as the front seat can be tilted forwards to enable the occupants of the rear seat to reach or leave their places with greater ease.

The springs 7, 8 may be covered with webbing, and cushions may be attached to the webbing in any convenient manner practised in the art of upholstering.

In the modification shown in Figs. 3 to 7 the lower part of the main frame comprises two approximately U-shaped members 16 resting on the floor, but the back has two side bars 17 pivoted to the rear arms of these members 16. The frame has cross-bars 18, 19, 20, 21, 22. Curved strip springs 23 and 24 are attached to the cross-bars 22 and 18 respectively. The rear ends of the springs 23 are fixed to a transverse rod 25 and the lower ends of the springs 24 are fixed to a transverse rod 26, the connection being made by rivets 27. The rods 25, 26 have hexagonal ends engaging into slots 28 in links 29. The edges of the slots 28 are serrated, so that the ends of the rods fit into selected portions thereof, enabling the rear of the seat to be raised or lowered by making a greater or less portion of the links intervene between the springs 23 and 24. The seat can also be lengthened or shortened by placing the links in a more or less inclined position, the change being made by slipping the links off the rods 25, 26 and re-engaging them with the rods at a different angle. In Fig. 6 one of the links is shown in full lines in a vertical position, and in broken lines in an inclined position whereby the seat is lengthened to the extent indicated by the arrow-headed line a. The links are retained on the rods by removable transverse pins 30.

The seat has arm-rests consisting of arched, upholstered springs 31. These are attached to the front cross-bar 22 and to the projecting ends 26¹ of the rod 26.

Webbing is stretched upon the springs 23 and 24, and upholstery cushions are attached to the webbing.

The angle of the back is adjustable by rocking the members 17 on their pivots and fixing them in the selected position by means of clamps 32, the two clamps being actuated by means of a single handle 33 and a rod which passes through the bar 20, the latter being hollow for that purpose. Fig. 3 shows the back in its normal, nearly upright position, and Fig. 4 shows it adjusted for reclining in a nearly horizontal position.

What I claim as my invention and desire to secure by Letters Patent of the United States is:—

1. In a seat the combination of a front, transverse seat rail, strip-springs supported by said rail and extending rearwards, a top transverse back rail, strip-springs suspended from said top rail, and adjustable means connecting the rear ends of the first-mentioned springs to the lower ends of the second-mentioned springs, allowing of regulating the distance between the connected spring ends and also allowing freedom of substantially horizontal and vertical movement to the connected spring ends.

2. In a seat the combination of a front, transverse seat rail, strip-springs supported by said rail and extending rearwards, a top transverse back rail, strip-springs suspended from said top rail, polygonal members fixed to the rear ends of the first-mentioned springs, polygonal members fixed to the lower ends of the second mentioned springs, links connecting the first-mentioned polygonal members to the second-mentioned polygonal members, said links having longitudinal slots with serrated edges into which said polygonal members are adapted to engage at selected parts of their length and with the links at selected angles.

3. In a seat the combination of two lateral frame members of approximately U-shape, the rear limbs of said members being longer than the front limbs, a front transverse rail connecting the upper ends of the shorter limbs of said frame members to each other, a back transverse rail connecting the upper ends of the rear limbs of said frame-members to each other, strip-springs attached to said front rail and extending rearwards, strip-springs suspended from said back rail, and means connecting the rear ends of the first-mentioned springs to the lower ends of the second-mentioned springs, allowing freedom of substantially horizontal and vertical movement to the connected spring ends.

4. In a seat the combination claimed in claim 3, together with additional transverse rails connecting the rear limbs of the lateral frame members to each other, adapted to serve as a hand rail and a foot rest for a person sitting behind the seat.

5. In a seat the combination claimed in claim 3, the longer limbs of the lateral frame members having pivotal joints and clamping devices enabling the upper portions of said limbs to be adjusted at selected angles.

6. In a seat the combination of a front, transverse seat rail, strip-springs supported by said rail and extending rearwards, a top transverse back rail, strip-springs suspended from said top rail, means connecting the rear ends of the first-mentioned springs to the lower ends of the second-mentioned springs, allowing freedom of substantially horizontal and vertical movement to the connected spring ends, and arched arm-rest springs having their front ends attached to the front transverse rail and having their rear ends connected to the means connecting the suspended springs to the rearwardly extending seat springs.

7. In a seat the combination of a frame having a front, transverse seat rail, and a top, transverse back rail, strip-springs fixed to said front rail and extending rearwards therefrom, strip-springs fixed to said top rail and extending downwards therefrom, and means connecting the rear ends of the first-mentioned springs to the lower ends of the second-mentioned springs, said means including a member connecting together the ends of all of said springs, allowing to the connected spring ends freedom of substantially horizontal and vertical movement in relation to said frame.

EMIL WOLPERT.